United States Patent Office 3,338,842
Patented Aug. 29, 1967

3,338,842
CATALYSTS FOR THE PREPARATION OF
TETRAMETHYLLEAD
Francis M. Beaird, Jr., and Paul Kobetz, Baton Rouge,
La., assignors to Ethyl Corporation, New York, N.Y.,
a corporation of Virginia
No Drawing. Original application May 29, 1963, Ser. No.
284,002, now Patent No. 3,188,332, dated June 8, 1965.
Divided and this application Feb. 17, 1965, Ser. No.
433,480
6 Claims. (Cl. 252—431)

This application is a division of our co-pending application Serial No. 284,002, filed May 29, 1963, entitled "Preparation of Tetramethyllead" (formerly entitled "Chemical Process"), now U.S. Pat. 3,188,332.

This invention relates to the manufacture of alkyllead compounds. More particularly, the invention relates to a new and improved process for the synthesis of a tetramethyllead product.

It has long been known that the tetraalkyllead compounds can be made, generally, by the reaction of an alkali metal lead alloy and an alkyl halide, particularly, the mono sodium lead alloy NaPb and the corresponding alkyl chloride. This type of synthesis reaction has been employed for an appreciable period for making large amounts of tetraethyllead. The chemical reaction is operative for other tetraalkylleads, and recently considerable interest has developed in the manufacture and use of tetramethyllead, which is an appreciably more volatile lead antiknock compound.

Although the indicated chemical reaction, applied to the manufacture of tetramethyllead is operative, it is not too effective insofar as yields are concerned, relative to the type of results which can be achieved with tetraethyllead. In addition, the synthesis of tetramethyllead presents much more drastic control requirements, and requires more rigorous control than the corresponding type of synthesis of tetraethyllead, because of the substantially higher vapor pressure of tetramethyllead and of the methyl chloride used in its synthesis. A substantially improved procedure for the synthesis of tetramethyllead is disclosed in U.S. Patent 3,049,558 by Cook et al. According to the Cook et al. process, a controlled quantity of a class of inert liquid hydrocarbons, provides, in the presence of a catalyst, appreciably greater yields than is achieved when no inert hydrocarbon is present. The hydrocarbons generally are those having an atmospheric boiling point of about 90–150° C. and these are employed in relatively small concentrations based on the lead in the alloy charged. Aluminum type catalysts are highly effective catalysts.

According to the Cook et al. process, yields of the order of 60–75 percent can be obtained in the reaction periods of less than about seven hours.

The foregoing improved process has been quite successful, but even with the improvement therein obtained, it is evident that considerable room for additional improvement has subsisted. Thus, even a yield of 60 to 70 percent, although higher than previously obtained, obviously allows ample room for improvement, especially when it is considered that in the reaction involved, even a 100 percent yield would result in release of about three-fourths of the lead as excess or byproduct metallic lead which is necessarily recovered, realloyed, and, normally re-used.

Another problem encountered in tetramethyllead synthesis is frequent difficulty in discharge of reaction mass from commercial scale autoclaves. By reaction mass is meant the mixture of materials present in a reaction zone or autoclave at the termination of reaction which mixture includes the aforementioned subdivided lead, the tetramethyllead product, alkali metal chloride, minor amounts of nonreacted chloride, and trace impurities or additives. Also present in the reaction mass is the inert hydrocarbon customarily employed. The major component of the reaction mass is subdivided lead, owing to the above mentioned stoichiometry of the synthesis reaction. The reaction mass resembles a granular mixture and is discharged from autoclaves by rotation of agitator devices having plow elements for transport of the reaction mass to a discharge nozzle or valve. In the course of commercial operations, considerable difficulty has frequently been encountered in this respect. Another difficulty has arisen from the fact that, using aluminum type catalysts, apparently the reaction mass also contains a residual amount of active alkyl-aluminum component which is quite susceptible to oxidation or other reaction. This is manifested by fuming or smoking of the reaction mass when exposed to gaseous atmospheres, even when such atmospheres are relatively free of oxygen. Such fuming necessitates the extensive use of particularly pure inert gas to partly alleviate the problem. The fuming or smoking is especially disadvantageous in that such fumes appear to deposit solids in subsequent heat exchanger equipment which significantly fouls and reduces the capacity of such equipment.

An object of the present invention is to provide a new and improved process for the manufacture of tetramethyllead. A particular object is to provide a novel catalyzed process for the synthesis of tetramethyllead whereby excellent yields are obtained and whereby the fuming or smoking tendency of the reaction masses produced are substantially minimized.

In the most general form, the present invention comprises reacting an alkali metal lead alloy with methyl chloride, and in the presence of a catalyst system including an aluminum catalyst and a cyclic diether of the meta dioxane type. The aluminum catalyst is most frequently a hydrocarbon aluminum compound, as discussed more fully below. However, aluminum trihalides and aluminum metal can be provided for this purpose.

The hydrocarbon aluminum compounds employed are, generally, any aluminum compound having at least one hydrocarbon radical per aluminum atom. Typical hydrocarbon aluminum compounds which are suitable include trimethyl aluminum, triethyl aluminum, ethyl aluminum sesquichloride, methyl aluminum sesquichloride, diethyl aluminum chloride, ethyl aluminum dichloride, tri-n-propyl aluminum, tri-n-butyl aluminum, triisobutyl aluminum, diisobutyl aluminum hydride, triphenyl aluminum, trioctyl aluminum, diethyl aluminum hydride, and tri-decyl aluminum. The most generally used catalysts are, then, aluminum compounds having at least one hydrocarbon radical of from one to about ten carbon atoms. The simpler alkyl aluminum compounds, such as mentioned illustratively above, are preferred. When desired, the hydrocarbon aluminum catalyst component can be generated in situ, as for example, by the reaction of an aluminum trihalide with a hydrocarbon compound of another metal. Thus, the reaction of aluminum trichloride and tetraethyllead will generate hydrocarbon aluminum moieties operative as this catalyst component.

As indicated, the second component of the improved catalyst system is a compound of the meta-dioxane type, viz., metal dioxane as such, and numerous hydrocarbon substituted derivatives thereof. Examples of such additional catalyst components are:

4,4-dimethyl-m-dioxane;
4-methyl-m-dioxane;
4-ethyl-5-methyl-m-dioxane;
4,4,5-trimethyl-m-dioxane;
4,4,5,5-tetramethyl-m-dioxane;
2,4,4,6-tetramethyl-m-dioxane;
4-methyl-4-phenyl-m-dioxane;
4-phenyl-m-dioxane;
5-methyl-4-phenyl-m-dioxane;
4-vinyl-m-dioxane;
1,3,7-trioxadecalin;
4,4-dimethyl-2,6-diphenyl-m-dioxane;
4,4-dimethyl-m-dioxane;
2,4,4,5,6-penta-m-dioxane;
5-tert-butyl-4,4-dimethyl-m-dioxane, and
5-ethyl-4-phenyl-m-dioxane.

Various operating procedures are permissive for carrying out any particular embodiment of the process. In general, batch or cycle techniques are preferred. According to such techniques, a reaction zone is charged with subdivided solid sodium lead alloy, usually the monosodium lead alloy although some variation from this is permissive. Then the catalyst components are charged, usually in conjunction with a minor quantity of an inert hydrocarbon material, generally in the proportions of about four or five to about twenty weight percent of the lead in the alloy. The catalyst system, as already indicated, includes in all instances, an aluminum catalyst in conjunction with the meta-dioxane catalyst adjuvant.

Several different modes of introducing the catalyst system to the reaction zone are available. A preferred mode of addition involves providing both the aluminum and the meta-dioxane catalyst components in full at the beginning of the reaction.

As already stated, the initial charge usually includes an inert hydrocarbon liquid in limited proportions. The hydrocarbon is highly beneficial in that high yields are realized at lower pressures than would be encountered in the absence of the hydrocarbon and the thermal stability of the product is improved. Preferably, the hydrocarbon is an aromatic type liquid, commercial toluene being a particularly beneficial example.

After the above described charge the reactor is sealed except for necessary venting connections, the temperature is raised to, usually, 65° or above while the system is agitated, and methyl chloride is charged. The methyl chloride in some cases is charged all at one time, and in other cases is fed in over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present when the feed is "spread out" over a finite period.

The materials thus charged together are then reacted at temperatures averaging from about 85 to 110° C. Agitation is provided throughout the reaction period as the reacting system includes solids and volatile liquids. The reaction is continued to completion, requiring from about one hour and less than seven hours, dependent on the configuration of the apparatus, the degree of agitation, and the quantity of alloy to be reacted.

On completion of the reaction, the autoclave and contents are cooled and discharged, and the tetramethyllead is recovered from the lead and alkali metal chloride components of the reaction mass. When small portions of hydrocarbon additive are employed in the synthesis reaction, the tetramethyllead is usually accompanied on recovery by said hydrocarbon liquid.

As already described, in all cases an aluminum catalyst plus a meta-dioxane catalyst adjuvant is employed, the latter being selected from the group consisting of meta-dioxane and hydrocarbon substituted meta-dioxanes. The aluminum catalyst is provided in proportions of 0.02 to about 0.3 weight percent aluminum content, based on the sodium lead alloy used. A preferred range is from about 0.04 to 0.25 weight percent, an even more preferred range being 0.08 to 0.15 weight percent aluminum. The precise proportions of the aluminum catalyst in any specific example depends, of course, on the composition and molecular weight thereof.

With respect to the meta-dioxane type component, its ratio to the aluminum component is not highly critical. Highly effective results are obtained from about one-tenth to as high as fifteen moles per atom of aluminum in the aluminum catalyst. Lower and higher proportions can be used, with appreciably less benefit, or with no supplemental benefits, respectively. It will be appreciated that the concentrations throughout this range are in catalytic proportions, owing to the low concentrations of the aluminum catalyst. A preferred proportion of the meta-dioxane component is from about one-fourth to five moles per atom of aluminum, an even more preferred range being from about one to three moles per gram atom.

The present invention results in the attainment of high ultimate yields, frequently higher than normally encountered. Other benefits are also realized. For comparison purposes, a series of "base line" or normal operations were conducted to provide a reference basis for contrast when following the procedure of the present invention.

An autoclave was charged with 1000 parts of comminuted monosodium lead alloy, containing 10 weight percent sodium. A mixture of an aluminum type catalyst, dissolved in anhydrous toluene, was then charged while agitating the contents of the autoclave. The said solution was provided in proportions of about 54 parts toluene by weight and the aluminum catalyst was charged in proportions of about 0.24 weight percent aluminum content based on the alloy charged. According to the identity of the aluminum catalysts, of course, the weight of the catalyst compound would be varied. Thus, in the case of using methyl aluminum sesquichloride, $(CH_3)_3Al_2Cl_3$, as the aluminum catalyst, a typical concentration was about 0.93 weight percent of the sodium lead alloy charged.

The charge thus established was then sealed in the autoclave and preheated to about 95° C., and then methyl chloride was fed to the autoclave interior. The temperature was controlled below about 110° C., and the methyl chloride was fed during a period of less than about 30 minutes in proportions corresponding to 1.7 "theories," or about 370 parts by weight per 1000 parts of the alloy charged.

Upon completion of the reaction, after reaction for a period of approximately two hours, the contents of the autoclave were cooled and removed from the interior. The amount of tetramethyllead produced was determined by extracting from the reaction mixture, or reaction mass, with a hydrocarbon solvent, with titration of the tetramethyllead by an iodine analysis of on aliquot of the liquid extract. Alternatively, in some instances, the reaction mass was subjected to steam distillation, for separation of the tetramethyllead from the excess lead powder and sodium chloride component of the reaction mass.

A series of operations as above described was carried out, using the procedure indicated and with occasional slight variation in the amount of catalyst provided. Using triethyl aluminum as the catalyst, the average yield obtained was 77.9 percent, and when using methyl aluminum sesquichloride as catalyst in comparable concentrations, the average yield was 76.8 percent.

The reaction mass attained in the above described base line runs was quite reactive, in that, when portions were exposed to the available nitrogen gas supply as an atmosphere considerable smoking occurred. In addition, frequent difficulty was encountered in discharging the autoclave in that the reaction mass was sticky and gummy and tended to adhere to the vessel walls and agitator.

Example 1

In this operation, a similar procedure to the base line operations was followed, except that the aluminum catalyst, in this case methyl aluminum sesquichloride, was reduced to proportions of 0.46 weight percent based on the alloy, and in addition, meta-dioxane was concurrently charged at a concentration of about 1.03 wt. percent of the alloy. This corresponds to an aluminum concentration of 0.12 weight percent of the alloy, and the meta-dioxane in proportions of 2.6 moles per atom of aluminum. Upon completion of the reaction, it was found that a yield of 91.1 percent of tetramethyllead was obtained, representing a yield improvement of 14.3 percent above the results obtained according to the base-line procedure. In addition, inspection of the reaction mass produced by the process showed that it was not sticky or lumpy, and could be readily discharged from the autoclave. The reaction mass also was superior in not exhibiting any fuming or smoking when contacted with a gaseous atmosphere.

In the foregoing example, as indicated, the aluminum catalyst plus the meta-dioxane was added at the same time. In other operations, alternative modes of introducing the dual catalyst components have been employed. These include the following:

Reverse addition: The synergist additive, or the meta-dioxane compound is added first, and thereafter the aluminum catalyst is provided.

Premixed addition: In this operation, the aluminum catalyst, the synergist of the present invention, and a hydrocarbon are mixed together prior to adding to the autoclave charge.

In other instances the catalyst system, viz., the aluminum alkyl plus the synergist, are added in increments spaced apart by an appreciable length of time, but within the first 15 minutes of reaction.

To illustrate the scope of the present invention more fully, additional working examples are given below:

Example 2

The procedure of Example 1 was repeated, except that the amount of meta-dioxane was lowered to a concentration of 0.4 weight percent of the alloy charged. A yield of 80.9 percent tetramethyllead was obtained, corresponding to a yield improvement of about 4 percent even though the concentration of the methyl aluminum sesquichloride was only about one-half that used in the base line runs. In addition, the reaction mass was non-fuming when exposed to a gaseous atmosphere, and was readily discharged from the reactor.

Both of the foregoing examples employed normal catalyst addition, i.e., using premixed toluene and the methyl aluminum sesquichloride, and the co-catalyst, fed entirely at the start of the operation. The following example describes an operation in which a "delayed" addition was used.

Example 3

The operations of Example 2 were repeated, except that in this case, the meta-dioxane was mixed with and added initially with about one-third of the toluene employed. A short period later, the methyl aluminum sesquichloride, dissolved in the remainder of the toluene, was charged. This operation provided a good yield, although not as high as in Examples 1 and 2, and a longer induction period was encountered before reaction proceeded at a good rate.

The examples following illustrate further the scope of the process.

| Example | Aluminum Component | | Meta-Dioxane Component | |
|---|---|---|---|---|
| | Identity | Concentration as Al, Wt. percent of Alloy | Identity | Moles/gm. Atom of Al |
| 4 | $(C_4H_9)_3Al$ | 0.05 | 4-methyl-m-dioxane | 4.8 |
| 5 | $(C_{10}H_{21})_2AlH$ | 0.30 | 4,4,5-trimethyl-m-dioxane | 3.2 |
| 6 | Al Metal | 0.23 | 2,4,6-tetramethyl-m-dioxane | 0.25 |
| 7 | $(C_2H_5)_2AlH$ | 0.08 | 4-phenyl-m-dioxane | 3.1 |
| 8 | $AlCl_3$ | 0.09 | 1,3,7-tri-oxa-decalin | 1.05 |
| 9 | $(iC_4H_9)_3Al$ | 0.14 | 4,5-dimethyl-m-dioxane | 2.8 |
| 10 | $(C_2H_5)_3Al$ | 0.03 | 5-t-butyl-4,4-dimethyl-m-dioxane | 4.5 |
| 11 | $(C_2H_5)_3Al_2Cl_3$ | 0.11 | 2,4,4,5,6-penta-m-dioxane | 2.6 |
| 12 | $(C_2H_5)_2AlCl$ | 0.12 | 4,4-dimethyl-2,6-diphenyl-m-dioxane | 2.5 |
| 13 | $(C_2H_5)AlCl_2$ | 0.11 | 5-methyl-4-phenyl-m-dioxane | 1.1 |
| 14 | $(nC_3H_7)_3Al$ | 0.12 | 4-ethyl-5-methyl-m-dioxane | 1.1 |

When carrying out the foregoing operations, good yields will be obtained and reaction masses will be obtained which are readily discharged from the reactor and exhibit little or no fuming.

In addition to the aluminum catalyst specifically illustrated above, other aluminum catalysts will be readily apparent to one skilled in the art. Accordingly, when any of the foregoing examples are repeated, similar results will be achieved by replacing the aluminum catalyst with another as used in a different example, or as previously illustratively listed. It will be readily apparent that, in the case of the aluminum catalysts having a plurality of hydrocarbon groups, such groups need not be identical. Thus, for example, a catalyst having the composition hexyl-butyl-ethyl aluminum would be quite effective. Similarly, instead of the alkyl aluminum chloride components, corresponding alkyl aluminum bromides or iodides can be substituted at least in part and will similarly function in the improved process. Further, it should be understood that the known complexed alkyl aluminum compounds can be employed as aluminum catalyst components. Illustrative of additional aluminum catalysts which can be substituted in the foregoing examples are alkali metal aluminum tetraalkyls or trialkyl hydrides, or the alkali metal aluminum alkyl halides. Thus, sodium aluminum tetraethyl, sodium aluminum triethyl hydride, lithium aluminum triethyl hydride, and similar complexes can effectively be substituted for the aluminum catalyst identified in the foregoing examples.

In addition to the explicit meta-dioxane components illustrated in the examples identified above, when 4,4-dimethyl-m-dioxane;
4,4,5,5-tetramethyl-m-dioxane;
4-methyl-4-phenyl-m-dioxane;
4-vinyl-m-dioxane; 1,3-dioxadecalin;
4-methyl-4-vinyl-m-dioxane;
2,4-dimethyl-m-dioxane, and
5-ethyl-4-phenyl-m-dioxane are individually substituted for the meta-dioxane component in the foregoing examples, comparable results are achieved. It will also be understood that when desired, the meta-dioxane component can include several compounds of the described class.

Having fully described the improvement of the present invention and the best mode of performing the process, what is claimed is:

1. A lead methylation catalyst composition comprising a hydrocarbon aluminum compound and a meta-dioxane compound, said hydrocarbon aluminum compound being at least one selected from the group consisting of alkyl, aryl, and alkyl-aryl aluminum chlorides and alkyl, aryl and alkyl-aryl aluminum hydrides, the alkyl and aryl radicals thereof having from 1 to about 10 carbon atoms each, said meta-dioxane compound being at least one selected from the group consisting of meta-dioxane alkyl, aryl and alkyl-aryl substituted meta-dioxane, said meta-dioxane compound being present in the proportion of from about 0.1 to about 15 moles per atom of aluminum in the hydrocarbon aluminum compound.

2. The catalyst composition of claim 1 further characterized in that said meta-dioxane compound is present in the proportion of from about 0.25 to about 5 moles per atom of aluminum in the hydrocarbon aluminum compound.

3. The catalyst composition of claim 1 further characterized in that said meta-dioxane compound is present in the proportion of from about 1 to about 3 moles per atom of aluminum in the hydrocarbon aluminum compound.

4. The catalyst composition of claim 1 further characterized in that said hydrocarbon aluminum compound is an alkyl aluminum chloride.

5. The catalyst composition of claim 1 further characterized in that said hydrocarbon aluminum compound is methyl aluminum sesquichloride.

6. A lead methylation catalyst composition comprising methyl aluminum sesquichloride and meta-dioxane, said meta-dioxane being present in the proportion of from about 0.1 to about 15 moles per atom of aluminum in said methyl aluminum sesquichloride.

References Cited

UNITED STATES PATENTS

| | | | |
|---|---|---|---|
| 2,956,992 | 10/1960 | Geiseler et al. | 252—429 |
| 3,116,273 | 12/1963 | Naylor et al. | 252—429 |
| 3,116,274 | 12/1963 | Boehm et al. | 252—429 |
| 3,124,561 | 3/1964 | Jenkins | 252—429 |

DANIEL E. WYMAN, *Primary Examiner.*

L. G. XIARHOS, *Assistant Examiner.*